United States Patent
Overholser

[15] 3,656,233
[45] Apr. 18, 1972

[54] MAKING POLYTETRAFLUOROETHYLENE ARTICLES INCLUDING TUBES, AND FITTINGS EMPLOYING SUCH TUBES, HAVING IMPROVED CONCENTRICITY AND DIMENSIONAL STABILITY

[72] Inventor: John S. Overholser, Klamath, Calif.
[73] Assignee: Dynalectron Corporation, Washington, D.C.
[22] Filed: Nov. 19, 1968
[21] Appl. No.: 776,909

Related U.S. Application Data

[63] Continuation-in-part of Ser. No. 577,381, Sept. 6, 1966, abandoned.

[52] U.S. Cl. ...................29/629, 264/346 R, 174/75 C, 174/75 R, 174/88, 174/89
[51] Int. Cl. .......................................................H02g 15/00
[58] Field of Search ...............29/624; 174/75.2, 89, 88.2; 264/249, 230, 345, 346, 347

[56] References Cited

UNITED STATES PATENTS

| | | | |
|---|---|---|---|
| 2,538,808 | 1/1951 | Swiss | 264/230 |
| 3,130,260 | 4/1964 | Gray | 264/230 X |
| 3,281,512 | 10/1966 | Reiling | 264/230 X |
| 3,409,864 | 11/1968 | Hoffman | 264/230 X |

Primary Examiner—John F. Campbell
Assistant Examiner—Robert W. Church
Attorney—Owen, Wickersham & Erickson

[57] ABSTRACT

Starting from high quality, dense, and relatively dimensionally stable rods of polytetrafluoroethylene, the invention provides articles including tubes and fittings incorporating such tubes having very accurate concentricity and improved dimensional stability by: first machining and drilling the rod stock to provide desired exterior and interior dimensions, in some cases then shaping the tube to provide elbows and in other instances leaving them straight. Then the tubes are confined and their interior filled, and the ends are mechanically compressed with considerable end pressure. Then the assembly is heated to a temperature and for a time long enough to cause the polytetrafluoroethylene to expand and fill the very accurately made confining parts and to grip tightly the filling part, which is also very accurately made, allowing time enough at such temperature to obliterate the memory of former configurations of the polytetrafluoroethylene and thereby relieve the stresses incurred by previous manufacture and by the compressing. Then the assembly is cooled and the compressing parts removed. The finished part cannot thereafter shrink endwise and it retains its dimensions and concentricity.

15 Claims, 7 Drawing Figures

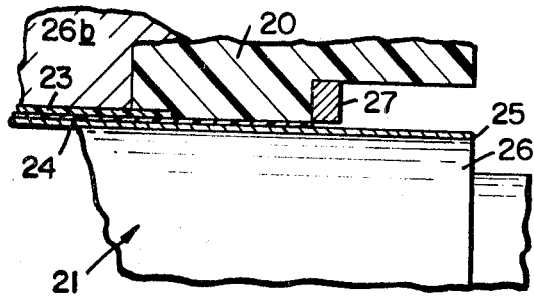
FIG_1
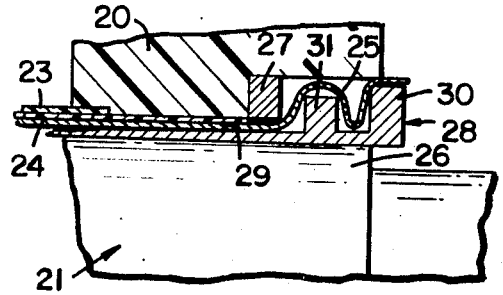
FIG_2
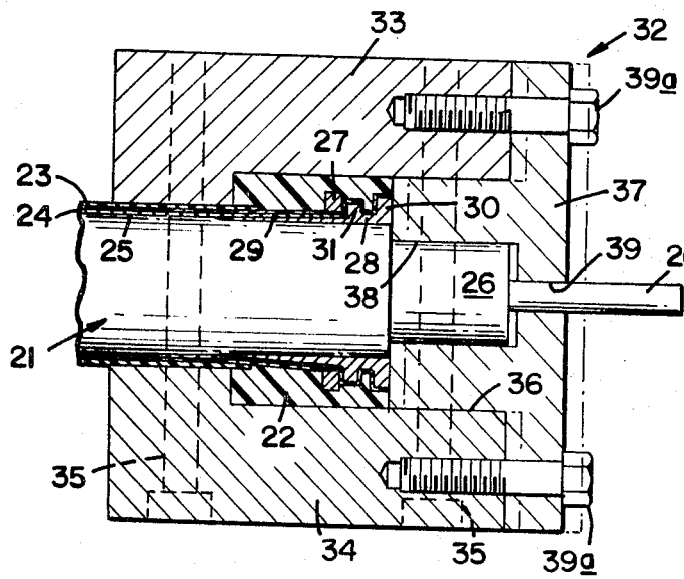
FIG_3
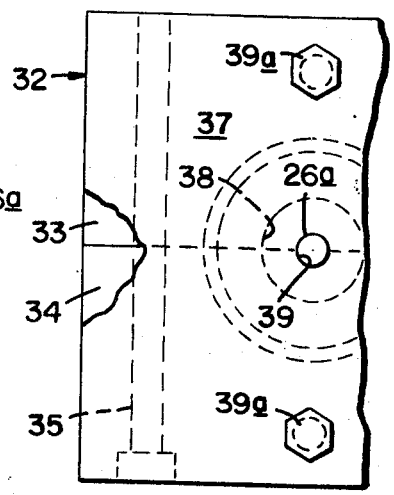
FIG_4
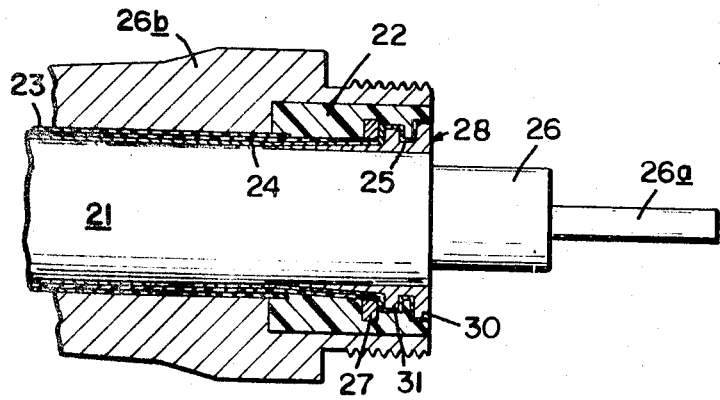
FIG_5
INVENTOR.
JOHN S. OVERHOLSER
BY
Owen, Wickersham & Erickson
ATTORNEYS

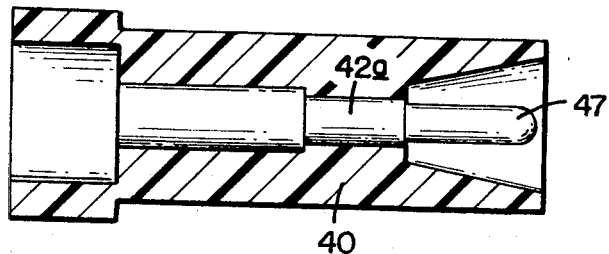
FIG_6
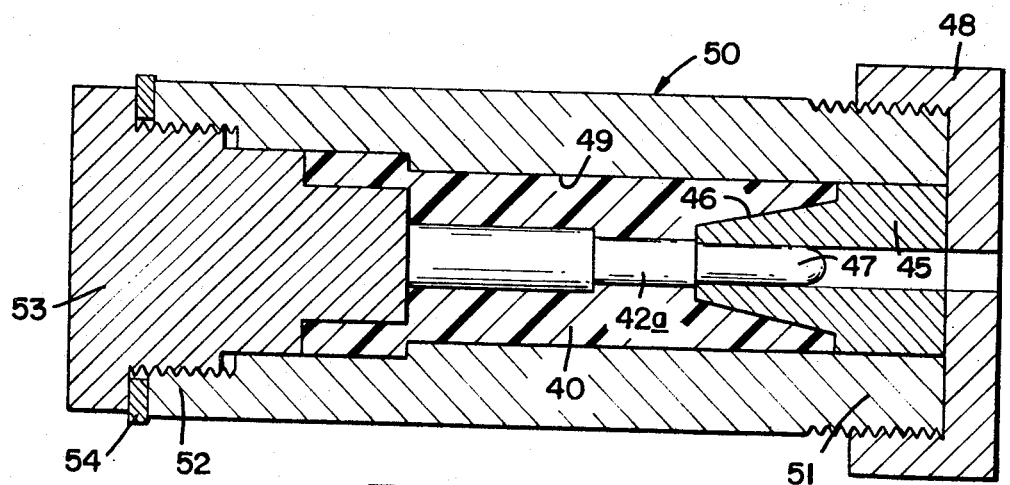
FIG_7
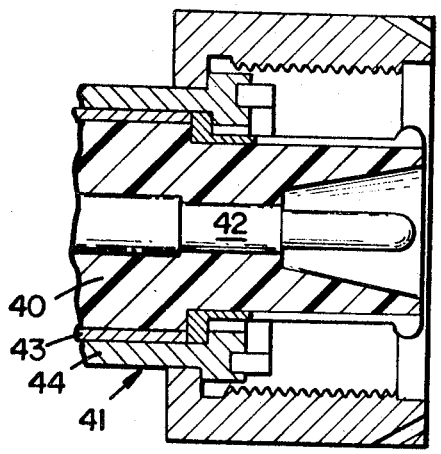
FIG_8
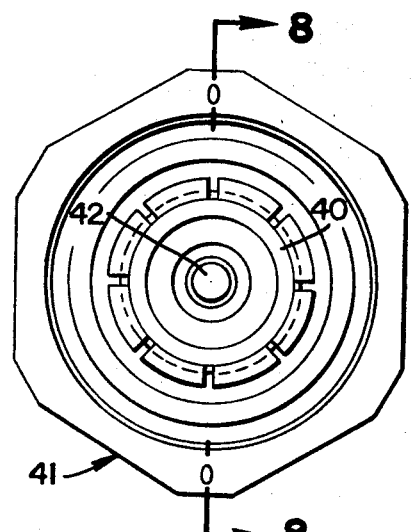
FIG_9
INVENTOR.
JOHN S. OVERHOLSER
ATTORNEYS

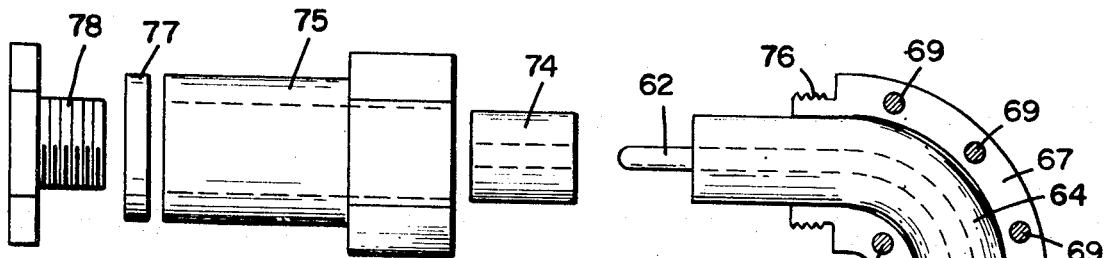
FIG_12
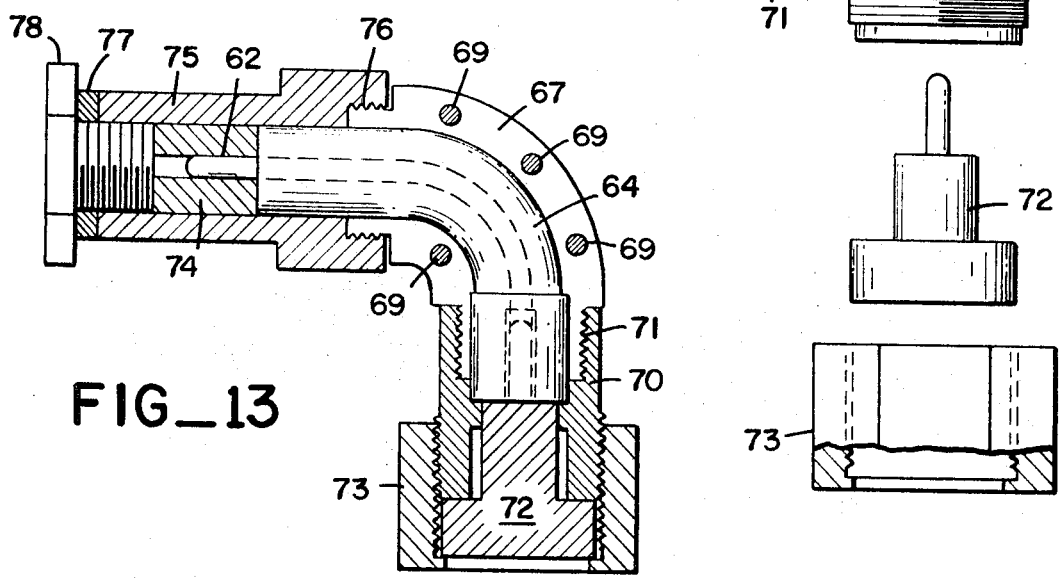
FIG_13
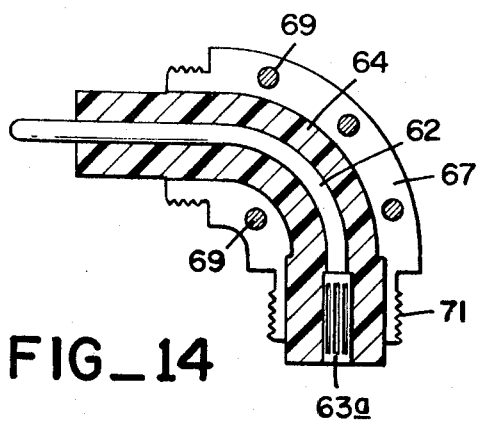
FIG_14
INVENTOR.
JOHN S. OVERHOLSER
BY
Owen, Wickersham & Erickson
ATTORNEYS

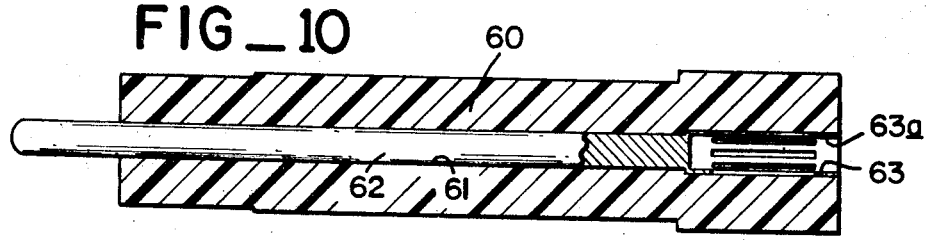
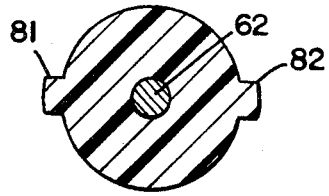
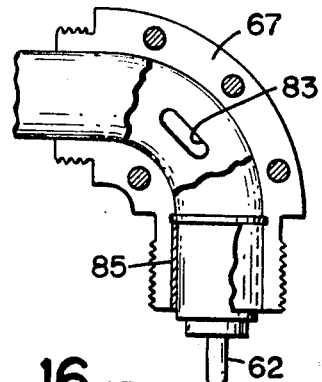
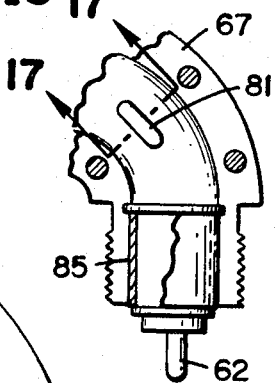
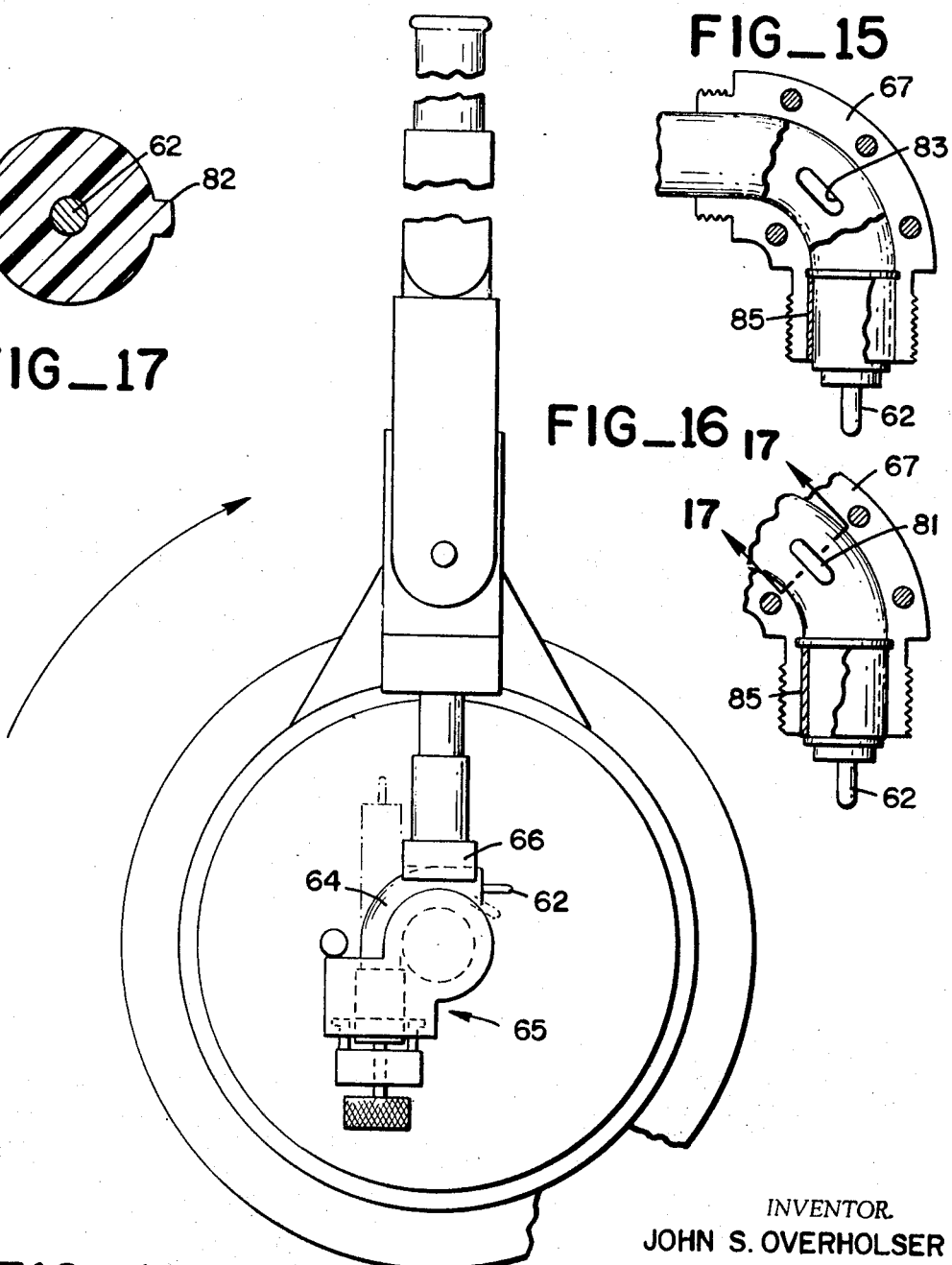
INVENTOR
JOHN S. OVERHOLSER

MAKING POLYTETRAFLUOROETHYLENE ARTICLES INCLUDING TUBES, AND FITTINGS EMPLOYING SUCH TUBES, HAVING IMPROVED CONCENTRICITY AND DIMENSIONAL STABILITY

SPECIFICATION

This application is a continuation-in-part of application Ser. No. 577,381 filed Sept. 6, 1966, now abandoned.

This invention relates to the manufacture of polytetrafluoroethylene articles, including tubes and of fittings incorporating these tubes as an important element thereof.

Polytetrafluoroethylene tubes may be made in many different ways, but the trouble has been that most of these ways have led to parts which were not truly concentric and lacked enough dimensional stability. When incorporated in certain types of fittings, such as those in use in certain electronic equipment used in aeronautical and space work, the poor concentricity of such tubes has kept them from giving the desired and intended results, and the tubes have been too unstable dimensionally to perform properly. Such tubes have been made directly by a sintering process, but when so made the results were not satisfactory, even if the material was first sintered under high pressure and then recompressed later, because strains were built up in the material that made it weak and unstable. Similarly, tubes that were extruded have not been satisfactory because of their inability to retain concentricity within the required narrow tolerances and their inability to remain stable along critical dimensions, due to internal strains, even with stress relief, and memory effects that result in distortions. Similarly, tubes that were machined from rod stock, even though a very high quality rod was used, which was considered to be dimensionally stable for most uses, have not given satisfactory results in really critical work. The machining itself has tended to cause some inaccuracies since the polytetrafluoroethylene material is not completely rigid and tends to bend or become somewhat deformed merely as a result of coming into contact with the machine tools. Moreover, the heat resulting from the machining tended to cause some minor deformations which later gave rise to major problems.

Heretofore it has also been difficult to obtain accurate finishes on polytetrafluoroethylene surfaces when the polytetrafluoroethylene is machined. Finishes have been about 32 millionths of an inch r.m.s. at the best, whereas requirements have sometimes called for four millionths of an inch r.m.s.

Thus problems which might appear to be relatively simple have been difficult. Techniques used for maintaining concentricities and dimensions of hard metal parts such as steel and brass have not proved suitable, and processes which have given good results with many plastics, such as molding and extrusion, have not proved satisfactory under the critical conditions mentioned.

I am not completely certain why these other processes have been unsatisfactory when used on polytetrafluoroethylene but it apparently has something to do with the inner constitution of the material. There is some indication that it may be partly due to occluded fluorine gas which must be taken out, but there are indications that occluded gas is not the only factor involved, so that degasification alone probably cannot achieve the desired results; it may even be that some occluded gas remains in articles which I have found to be fully satisfactory, although I believe the amount of such gas to be much less than what was originally in such articles before they were treated in accordance with this invention. In any event, whatever the cause, whether it be the presence of gas or whether it be a matter of molecular arrangement, it is well-known that polytetrafluoroethylene parts tend to have memory. In other words, they tend to resume an original shape. Parts that have been bent tend to straighten themselves out, parts that have been compressed in length tend to elongate themselves, parts that have been compressed radially tend to expand radially, and so on. This factor of memory has caused problems in such parts by foiling the efforts made to achieve close tolerance in dimensions, by tending to resume former inaccurate dimensions—though it is unpredictable and never can be counted on to resume exactly its former dimensions.

It should be made clear at the outset that the present invention does not start with powdered polytetrafluoroethylene and relate to an improved sintering process. Rather, it starts with high-quality rod stock which may be manufactured by the person carrying on this process or may be purchased from one of the suppliers of such high-quality rod stock. The better the starting material, the easier it is to produce a satisfactory final product, so that I prefer to start with as high quality a polytetrafluoroethylene rod stock as I can obtain. The process will overcome some inaccuracies and failings in the rod stock, but for extreme accuracy the starting material has an important part to play. The high-quality rod stock may have been extruded in certain processes or may have been formed in other ways, but the very starting material of the invention is a rod stock that is well-made, has a generally uniform density, and has what has heretofore been considered good dimensional stability. Such parts, however, do not have the dimensional stability required in uses to which the present invention is directed. Such material tends to have too great a temperature coefficient of expansion, has a non-linear and generally unpredictable temperature coefficient, tends to have this temperature coefficient mainly in its lengthwise direction in some instances, and mainly in its radial direction in some other instances, with strong accentuation in one of these two directions, depending on what process was used for manufacturing the stock, this being part of the memory of the polytetrafluoroethylene rod. The predominant tendency is to shrink lengthwise. If such parts are taken and used, whether made originally as tubes or whether machined very accurately from the rod stock, they will, unfortunately, not be able to meet and maintain the government specifications for high-accuracy electronic parts.

I have found that this rod stock can be made to meet the specifications including extremely fine finishes (better than 10 millionths of an inch r.m.s.) by a process which begins with machining it accurately and drilling it accurately, to give a desired shape and size of an article, relatively low tolerances being maintained in the machining and drilling steps. Then the material is filled with an electrical conductor or some other rigid article filling the interior of the tube, and in some instances is thereupon bent to provide an elbow, while in other instances it is left as a straight cylinder. In either instance, the article is thereafter placed within a confining housing or mold, often including parts in which it is to be permanently secured. At this point it can be clearly observed that the polytetrafluoroethylene is uneven and does not accurately fill a really accurately made confining part; moreover, the interior part is sometimes still loose within it. After that, a critical step is the mechanical compression or forcing-in of the ends of the tube while completely confining the tube. This compression exerts considerable pressure in a lengthwise direction on the ends of the tube and shortens the tube. After the compression, the assembly is immediately heated while still confined and with the mechanical compressing parts in place, the temperature depending somewhat upon the environment and conditions but being at a minimum of about 180° F. and with a maximum up to about 500° F. but well below the melting and the sublimating points of the polytetrafluoroethylene. The tube is maintained at this temperature and under the pressure of the compression, and the pressure resulting from the heating leads the polytetrafluoroethylene to expand and fill all the space within which it is confined. After all such space is gone, it appears to fill internal space, so that it ends up denser than before this treatment. Care must be taken not to raise the heat to a point above that which the confining parts can bear, and of course they should be made reasonably strong so that they can bear the requisite amount of pressure. The polytetrafluoroethylene thereby loses its internal stresses which were incurred when the rod was made, when it was machined, when it was bent, and when it was compressed. The conditions of pressure and temperature are maintained for a time sufficient to obliterate the former memory of the polytetrafluoroethylene part and to set up conditions producing a new memory, and then it is slowly cooled. Upon cooling, the compressing parts are removed, and it will be found thereafter that the polytetrafluoroethylene tube has the concentricity, size, and finish imparted by the filling and confining parts, and therefore is as accurate as those parts are, and with a dimensional stability which is phenomenal when compared with the starting material and with other polytetrafluoroethylene parts that have been made heretofore. The rod's former tendency to shrink with time even when the temperature remains constant is substantially eliminated. Changes in size that may be produced by temperature changes are predictable, and the article returns to the same size at the same temperature.

Normal polytetrafluoroethylene, including the rods from which the products of this invention are made, have their greatest temperature coefficient of expansion between 70° and 90° F., and it is also most erratic and unpredictable within that range. In contrast, articles of this invention have a very low temperature coefficient of expansion between 70° and 90° F. and will always return to their normal size at a given temperature.

Other objects and advantages of the invention will appear from the following description of some preferred embodiments thereof, showing the making of three typical products.

In the drawings:

FIG. 1 is a fragmentary view in elevation and in section of a braided cable, the end of which is to be encased in an encircling tube of polytetrafluoroethylene, which is to serve as a strengthening member and a cable grip, but at the FIG. 1 stage lacks any mechanical grip.

FIG. 2 is a view similar to FIG. 1 showing a subsequent part of a process, wherein a metal outer conductor is being installed.

FIG. 3 is a view on a scale smaller than FIG. 1 showing another step of the process, the polytetrafluoroethylene tube now being confined in a compressing mold.

FIG. 4 is a fragmentary view in end elevation of the assembly of FIG. 3.

FIG. 5 is a fragmentary view similar to FIG. 3 of the completed part resulting from the process of FIGS. 1–4.

FIG. 6 is a view in elevation and in section of a machined and mandrel-filled polytetrafluoroethylene tube to be used in manufacturing a part in the process of FIGS. 7–9.

FIG. 7 is a view similar to FIG. 6 showing the part after it has been enclosed and compressed.

FIG. 8 is a view in section of an end portion of the finished assembly resulting from the process of FIGS. 6 and 7, taken along the line 8—8 in FIG. 9.

FIG. 9 is an end view of the assembly of FIG. 8.

FIG. 10 is a view in elevation and in section of a straight tube of polytetrafluoroethylene after insertion of a probe and after initial maching, and used to make the part shown on a smaller scale in FIG. 14.

FIG. 11 is a plan view of the bending assembly used to form an elbow from the tube of FIG. 10. The handle has been broken to conserve space.

FIG. 12 is an exploded view of the elements used to make the assembly of FIG. 14 before they are put together.

FIG. 13 is a view in cross section of the assembly of the parts of FIG. 12.

FIG. 14 is a view in section of the finished part of FIGS. 10–13.

FIG. 15 is a view similar to FIG. 14 of a modified form of product, parts being broken away and shown in section, shown before the compressing operation.

FIG. 16 is a fragmentary view similar to FIG. 15 of the product after compression, with part broken off. In this case the finished product includes a rotary bearing.

FIG. 17 is a view in section taken along the line 17—17 in FIG. 16.

In each of the instances given in this application as examples of processes embodying the principles of the invention, I start with high-quality polytetrafluoroethylene rod stock and machine it exteriorly to provide such portions of different diameter as are desired, while being careful to make the diameters desired within the tolerances obtainable from machining, normally about 0.002 inch. Thus, in FIG. 1 a polytetrafluoroethylene tube 20 has been made from rod stock, machined to give the desired exterior shape, and drilled to provide the desired interior opening. The assembly which is illustrated in FIGS. 1 through 5 is a fairly simple example of the use of the invention, but it is an important one. Here a braided coaxial cable 21 is to have affixed at each end a polytetrafluoroethylene member 22 that will grip the cable 21 thoroughly and will withstand a 180-pound pull on the ends, while at the same time providing an end seal against moisture. If the tube 20 is simply machined and put on, it will not provide this end seal, nor will it grip the cable 21 with enough force. It is well known that polytetrafluoroethylene tends to be slippery, and, in fact, it has many uses involving its lubricity, but in some instances the material, while desirable perhaps because its exterior surface has that very quality of lubricity, must thoroughly grip something and to make it do this has not proved easy. By using the method of this invention, however, a very tight grip is obtained in the completed assembly.

Thus, in FIG. 1 the braided wire cable 21 has had an outside protective cover 23 cut off at the end to enable the tube 20 to be sealed to a moisture-sealing extruded tube 24 of polytetrafluoroethylene, which is also cut off a little past the cover 23 to expose a braided wire conductor 25. The conductor 25 surrounds an inner layer 26 of polytetrafluoroethylene dielectric tape, which, in turn surrounds an inner conductor 26a. Before proceeding further an aftermost part 26b of an outer connector is put around the cable 21 and then the tube 20 is put around the cable 21, followed by a metal washer 27. A tubular metal outer conductor 28 that is to be connected electrically with the conductor 25 has a generally conical exterior surface 29 and two spaced integral flanges 30 and 31. This conductor 28 is put over the dielectric layer 26, and the wire braid 25 pulled over it and tucked into the space between the flanges 30 and 31; the washer 27 is then pushed back to clamp the braid 25 against the flange 31. Then the polytetrafluoroethylene tube 20 is slipped over the outside of that installation. No matter what is done mechanically, this tube 20 cannot thereby be made tight enough at this time. It is, at this time, overlength in order to be able to supply material needed to fill other portions, and at this time extends beyond the flange 30.

In the present invention, a mold 32 is then used, which has two parts 33 and 34 held together by screws 35 and is provided with an end socket 36 into which is fitted a plug 37 having a recess 38 the size of the dielectric core 26 and an opening 39 to receive the center conductor 26a. This plug 37 is made to abut to the end face of the polytetrafluoroethylene tube 20, and is tightened in place by screws 39a so as not only to abut the polytetrafluoroethylene face but actually to force it in up to the face of the flange 30. Then the entire assembly is heated to at least 180° F. and maintained at a high temperature for a time sufficient for obliterating the former memory of the polytetrafluoroethylene tube 20 while assuring a filling of the mold 32 within which it is confined. The temperature can be as high as 450° F. in this instance, although it can be lower. At 450° F. it should be retained for at least 30 minutes; at 180° F. it would be better to retain it in the mold 32 for about 24 hours, and in between the temperatures and times would vary accordingly. High temperatures are preferable to achieve the desired results and to assure enough flow to fill all voids. During this time at high temperature the polytetrafluoroethylene tube is being changed drastically, the pressure exerted by the endwise force or compression causing it to flow and form the grip member 22 of FIG. 5, filling all voids, adhering to the polytetrafluoroethylene tube 24 to seal moisture, and adhering to the outer cover 23 and encasing the braid 25.

When the assembly is cooled, the coining plug 37 is removed, and it is found that the material in the resulting polytetrafluoroethylene grip 22 has flowed radially to fill the mold 32 and to relieve the pressure on the compressed ends. Now it does not pull away from the cable 21 but grips it tightly to provide a very tight end seal against moisture and to resist a pull of at least 180 pounds exerted directly on it, which would otherwise tend to separate the tube 22 from the cable 21.

The polytetrafluoroethylene article 40 of FIGS. 8 and 9 is part of a coaxial fitting 41 containing a probe 42 which has to be kept concentric with the exterior metal parts 43 and 44 of the fitting 41. Again the starting material is high-quality polytetrafluoroethylene rod which is initially machined and drilled. Preferably, the machining is done by grinding in a centerless grinder and the drilling provides counterbores where needed. All diameters are kept to a tolerance of 0.001 inches and the concentricities between all parts are held within 0.002 inches T.I.R. The machining of the interior passage is left a little large, e.g. 0.005 to 0.010 inch.

The probe 42 may typically be a brass cylindrical rod having a suitable conductive plating on it, such as a precious metal plating or a silver-rhodium plating. The probe 42 is to be installed by pressing it in what may be called a rather tight slip fit, but it is still a slip fit and it can be pushed out of the finished article.

During manufacture of the article 40, the place of the probe is temporarily taken by a mandrel 42a which gives the necessary sizes and concentricities and finishes needed. A nonrotating compression fixture 45 with a conical outer face 46 is then put over the projecting end 47 of the mandrel 42a to maintain the concentricity during this process.

The assembly is to be put into the cavity 49 of a compressing die 50 which bears against the exterior surface of the polytetrafluoroethylene tube 40 and extends beyond it, with threaded end portions 51 and 52. In this instance, a plug 48 is threaded onto the end 51 up snugly against the fixture 45, and then the tube 40 is inserted and pushed against the fixture 45. Then the mandrel 42a is installed. Next a compressing plug 53 with spacing washer 54 is threaded into the end 52 and tightened until the washer 54 (which determines the compressed length) is tight against the die 50. This forces in the two ends of the polytetrafluoroethylene tube 40 by a substantial amount, e.g., up to 0.060 inch for a piece 3 inches long.

The assembly is then immediately placed in an electric oven or other suitable heat source, preferably at about 225° F. for 3 hours, up to 450° F. for about an hour, or the temperature may be somewhat lower (down to 180° F.) for a longer time, though the high temperatures in this instance are considered preferable. This time and temperature is sufficient to obliterate the former memory of the polytetrafluoroethylene, relieve the internal stresses, and force the material to flow and fill all voids, both internal and external and to the shape, size, and finish of the tooling. When it is taken out, the tube 40 has concentricity as good as that of the die 50, fixture 45 and mandrel 42a, and has a dimensional stability that is highly satisfactory.

The assembly shown in FIG. 14 and the process for making it has many similarities to that shown in my issued U.S. Pat. No. 2,933,714 with some minor differences, and with the important difference that the polytetrafluoroethylene part here is much more concentric and is much more dimensionally stable than I was able to obtain at the time that patent was pending.

Again, I start with a high-quality polytetrafluoroethylene rod which over-length. Machining, as by centerless grinding, is used to obtain desired dimensions on the outside, the tolerance there being held by plus or minus 0.002 inch, the tube 60 being about 0.090 inch to 0.070 inch longer than the final part of FIG. 14 will be, for a final part approximately 4 inches long. The rod is then drilled and reamed from each end to make a hole 61 appropriate for a probe 62, and it is counterbored to provide a larger opening 63 there. The probe 62 is then pressed into place; again the probe 62 may be brass with a conductive plating, and is made to have an interference fit, but it can still be slipped in. For example, the probe 62 may be 0.001 or 0.002 inch larger in diameter than the diameter of the interior 61 of the tube 60. A beryllium-copper basket 63a makes up part of the probe 62 and fills the counterbored passage 63.

This tube 60 is then put into a bending jig 65 shown in FIG. 10, and the basket 63a is supported at one end while a tool 66 irons the tube 60 around the radius, bending the probe 62 in a bending operation, which is substantially that shown in my U. S. Pat. No. 2,971,224. The tube 60 is thus bent into an elbow 64. The tendency of the tube elbow 64 to resume its original shape is noticeable, for it immediately springs back somewhat, so that bending is carried past center enough to give approximately the desired amount of spring-back, and then within just a few minutes the elbow 64 must be put into a casing 67, 68 to which it is to be attached. This may be, for example, the two-piece elbow shell 67, 68 which is held together by screws 69 (FIG. 12). If one waits too long, the elbow 64 will tend to straighten itself out to the point where it cannot be put in. It has been, during this step, stretched somewhat, and it will be noticed when it is put into the elbow shell 67, 68 that there are gaps between the polytetrafluoroethylene elbow 64 and the encasing elbow shell 67, 68. If this part were to be left in this manner, the changes in impedance would be considerable. It would not give a satisfactory operation; so here again the element 64 is to be treated to give a shape which will fill the cavity of the shell 67, 68 and grip the probe 62 and also change the characteristics of the rod and assure completely accurate concentricity and finishes.

Concentricity is once again assured by the die into which the elbow 64 is molded, part of the die being the shell 67, 68 which is a permanent part of the fitting and is made of a good metal that is capable of holding its shape. The die also includes a member 70 that is threaded onto the threads 71 of the shell 67, 68. Next a basket holder 72 is inserted to hold the basket 63a, and a nut 73 is used to tighten that end of the coining die. A probe holder 74 is put on to protect the probe end 62, and a die member 75 is then tightened on the threaded portion 76 of the shell 67, 68, a compression-length-determining washer 77 installed, and a compressing tool or fixture 78 is then threaded tightly on the die member 75, and it forces in the material to reduce its overall length by approximately 0.070 to 0.090 inch.

This assembly is preferably put into an oven at about 180° F. and maintained there for 24 hours. I have found that if the furnace is too hot, the threads of the confining elbow 67, 68 are sheared by the expansion of the polytetrafluoroethylene. Infrared heat may be used instead of the oven in any of these cases, and the heat is adjusted to give the desired amount of pressure to cause actual filling of all voids within the die while still not causing breakage of the confining parts, whether they be a mold from which the part will be taken out or the completed housing, as in this instance in which the part is to be left.

The compression or forcing-in of the end of the polytetrafluoroethylene elbow 64 exerts pressure on the polytetrafluoroethylene; if the mechanical compression alone were done the polytetrafluoroethylene would assume approximately its original shape and length, but when the compression is combined with heating several things happen. One is that the polytetrafluoroethylene flows sufficiently to fill the internal and exterior parts very tightly; a second is that the polytetrafluoroethylene reaccommodates to a shape in which it will have no substantial amount of endwise motion as compared with the radial motion. In other words, the compression or forcing-in results eventually in the polytetrafluoroethylene filling its confining parts in the radial direction, so that when it is cooled after the heating, the length has been shortened, the polytetrafluoroethylene has been made more dense, the die is completely filled, and the probe 62 very tightly gripped— much more tightly than before. Inspection of the part when sectioned or cut apart or taken apart otherwise shows that it has completely filled the confining parts of the die, and the reaction later shows that its lengthwise dimensional stability is quite great. It can still expand somewhat, but the expansion does not disastrously affect the accuracy of the instruments with which the fitting is being used.

As shown in FIGS. 15–17, it is even possible and desirable to mold a pair of locking lugs 81 and 82 into locking recesses 83 in the shell 67, 68. All that need be done is to mill the recesses 83 into the shell body and provide enough coining pressure and material in the elbow 64 to assure filling the recesses 83.

It is possible also to compress a metal sleeve 85 on to the polytetrafluoroethylene to act as a rotary joint, by the same method, as shown in FIGS. 15 and 16.

Electrical line transmission components of this invention include cable assembly connectors and adaptors that meet the stringent U. S. Government specifications, such as those in the U. S. Air Force WCLG–3B for Antenna System AN/ALA–15 (V), which call for operation over the temperature range of −67° to 203° F. and numerous severe tests, and those in U. S. Air Force drawings 60C2591 and 60C2592, requiring concentricity between all diameters and the center contact to be within 0.002 inch T.I.R. and call for a dissipation factor at 1 megacycle not to exceed 0.0002. Other Air Force drawings, including 61B3008 (calling for some dimensions to be within ± 0.001 of a specified dimension), 62B3073, 62C3076 (operation over a range of 30 to 5,000 megacycles, with maximum insertion losses between parts of 0.31 to 1.57 decibel, depending on the part), 63C3080, 63C3081, 63C3082, 63C3159, and 67C2118. Good transmission up to 6,000 m.c. may be obtained from this invention, and the very stringent tolerance requirements maintained.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for making polytetrafluoroethylene articles having controlled and improved dimensional stabilities and better finishes, starting from high-density relatively dimensionally stable polytetrafluoroethylene stock, comprising the steps of:
    shaping the surface of the stock material to give an article having approximately the shape and size desired,
    completely confining the article,
    mechanically forcing-in at least one end of said confined article to compress and shorten it,
    then heating the assembly while in the compressed position in the range of substantially 180° F. to 500° F. and well below the melting and sublimating points of the polytetrafluoroethylene, to cause expansion of the polytetrafluoroethylene to fill the space within which it is confined, under a pressure somewhat lower than what the confining parts can withstand,
    maintaining the assembly under the heat of the preceding step for a time sufficient to increase the density of the polytetrafluoroethylene, impart a finished surface, and obliterate the former memory of the polytetrafluoroethylene, and
    cooling the assembly and removing the members used for compression.

2. The method of claim 1 wherein said stock is cylindrical rod and said shaping comprises machining of said rod, said forcing-in exerting lengthwise pressure thereon.

3. The method of claim 2 wherein said stock is made tubular, with the interior filled before and during compression and heating by a rigid member.

4. The method of claim 1 wherein said stock is rod shaped and the shaping step is done by centerless grinding.

5. The method of claim 4 wherein the shaping includes drilling the rod to provide a tube and wherein the drilled opening is filled by a rigid part during compressing, heating, and maintaining steps.

6. A method for securing a polytetrafluoroethylene sleeve to a cable having an inner conductor and an outer conductor separated by insulation, a polytetrafluoroethylene tube around said outer conductor, and an outer cover around said tube, said sleeve having an inner diameter about that of the outer diameter of the outer cover, comprising the steps of:
    cutting off an end portion of the outer cover to expose the polytetrafluoroethylene tube,
    slipping the polytetrafluoroethylene sleeve over said cable around part of said outer tube and part of said cover,
    completely confining the exterior of said sleeve,
    forcing-in the end of said sleeve mechanically,
    heating the assembly to at least about 180° F. and well below the melting and sublimating points of the polytetrafluoroethylene, to provide a temperature sufficient to cause expansion of the polytetrafluoroethylene to fill the space within which it is confined,
    maintaining the assembly under the heat of the preceding step for a time sufficient to obliterate the memory of the polytetrafluoroethylene sleeve and to secure it to said tube, and
    cooling the assembly and removing the members used for forcing-in.

7. A method for securing a polytetrafluoroethylene sleeve and terminal conductor in a water-tight connection to a cable having an inner conductor and an outer conductor separated by insulation, a polytetrafluoroethylene tube around said outer conductor, and an outer cover around said tube, said sleeve having an inner diameter about that of the outer diameter of the outer cover, comprising the steps of:
    cutting off an end portion of the outer cover to expose the polytetrafluoroethylene tube,
    cutting off a shorter portion of said tube to expose said outer conductor,
    inserting said terminal conductor as a sleeve beneath the end of said outer conductor, clamping said outer conductor against a flange of said sleeve,
    slipping the polytetrafluoroethylene sleeve over said cable around part of said outer tube and part of said cover,
    completely confining the exterior of said sleeve,
    forcing-in the end of said sleeve mechanically,
    heating the assembly to between about 180° F. and 500° F., to provide a temperature sufficient to cause the polytetrafluoroethylene to fill the space within which it is confined, thereby encasing the portion of said outer conductor around said terminal conductor,
    maintaining the assembly under the heat of the preceding step for a time sufficient to obliterate the memory of the polytetrafluoroethylene sleeve and to secure it to said tube and cover, and
    cooling the assembly and removing the members used for forcing-in.

8. The method of claim 1 wherein the stock material is rod stock comprising the steps of:
    machining the exterior surface of the rod and drilling through the center thereof to give a tube approximately the interior and exterior shapes desired, and
    filling the interior of said tube with a metal part and completely confining the exterior wall thereof in a metal mold, said metal mold and metal part having the desired finish accuracy, dimensions, and concentricity.

9. The method of claim 8 wherein said tube is bent to a curved shape before said forcing-in, being retained in that shape during the remaining steps.

10. The method of claim 8 wherein the metal part is permanently secured to the tube.

11. The method of claim 10 wherein after said filling step and before said confining step said tube is formed into a nonlinear shape, and is maintained in that shape through the remaining steps.

12. The method of claim 11 wherein said confining step employs some parts to which said tube is to be permanently secured.

13. The method of claim 12 wherein said parts are provided with keying recesses into which the polytetrafluoroethylene of said tube flows during said heating and maintaining steps to provide projections extending from the as-machined wall of said tube.

14. The method of claim 10 wherein during said confining step a cylindrical metal sleeve is applied to and compressed to a cylindrical portion of said tube with a portion of said tube thereafter preventing removal of said sleeve, whereby said tube and sleeve make a rotary joint.

15. The method of claim 1 in which the article is a sleeve having an inner diameter about that of the outer diameter of a cable, comprising the steps of:
 slipping the sleeve over said cable and
 completely confining the sleeve in a mold while on the cable.

* * * * *